(12) United States Patent
Malik

(10) Patent No.: US 6,718,463 B1
(45) Date of Patent: Apr. 6, 2004

(54) SYSTEM, METHOD AND APPARATUS FOR LOADING DRIVERS, REGISTRY SETTINGS AND APPLICATION DATA ONTO A COMPUTER SYSTEM DURING A BOOT SEQUENCE

(75) Inventor: Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 09/640,542

(22) Filed: Aug. 17, 2000

(51) Int. Cl.[7] ............................................. G06F 15/177
(52) U.S. Cl. ............................... 713/2; 713/1; 713/100
(58) Field of Search ........................... 713/2; 711/162; 710/10

(56) References Cited

U.S. PATENT DOCUMENTS

| | | | | |
|---|---|---|---|---|
| 6,161,176 A | * | 12/2000 | Hunter et al. | 713/1 |
| 6,170,055 B1 | * | 1/2001 | Meyer et al. | 713/2 |
| 6,205,527 B1 | * | 3/2001 | Goshey et al. | 711/162 |
| 6,289,449 B1 | * | 9/2001 | Aguilar et al. | 713/2 |
| 6,317,845 B1 | * | 11/2001 | Meyer et al. | 714/23 |
| 6,370,646 B1 | * | 4/2002 | Goodman et al. | 713/100 |
| 6,529,966 B1 | * | 3/2003 | Willman et al. | 710/10 |
| 6,550,061 B1 | * | 4/2003 | Bearden et al. | 717/174 |

FOREIGN PATENT DOCUMENTS

| | | | | |
|---|---|---|---|---|
| JP | 06282979 A | * | 10/1994 | G11B/33/12 |
| JP | 08161862 A | * | 6/1996 | G11B/25/04 |

OTHER PUBLICATIONS

IBM TDB, Initialization Method for Mass Storage with PCMCIA Interface, Jun. 1, 1994, vol. 37 Issue 6B pp. 567–568.*

* cited by examiner

*Primary Examiner*—Thomas Lee
*Assistant Examiner*—Mark Connolly
(74) *Attorney, Agent, or Firm*—Duke W. Yee; Mark E. McBurney; Stephen J. Walder, Jr.

(57) ABSTRACT

An apparatus, system and method for booting a data processing system from a removable medium is provided. With the apparatus, system and method, a boot sequence is started to a point at which a file system is available. At that time, driver files and registry information is copied from the data processing system to the removable medium. The boot sequence is then restarted using the driver files and registry information copied. In this way, a removable medium, having application data and user defined setting information, may be used to customize a plurality of different data processing systems while still providing the user access to the particular data processing system configuration and peripheral devices of the data processing system. Thus, the user's customized settings provide a system interface that is familiar to the user while being able to make use of different hardware devices.

34 Claims, 3 Drawing Sheets

100

SYSTEM, METHOD AND APPARATUS FOR LOADING DRIVERS, REGISTRY SETTINGS AND APPLICATION DATA ONTO A COMPUTER SYSTEM DURING A BOOT SEQUENCE

BACKGROUND OF THE INVENTION

1. Technical Field

The present invention relates generally to an improved apparatus, system and method for booting a data processing system from a removable medium and in particular to a method and an apparatus for booting a data processing system from a PC card.

2. Description of the Related Art

In known data processing systems, the system itself is booted from a permanent storage device in the processing system. Thus, any customization performed to the operating system, applications, peripheral devices, and the like, is specific to that particular data processing system. If a user wishes to use these same custom settings on another machine, he/she must reconfigure the other machine in the same manner as he/she did with the first machine.

Furthermore, even if the permanent storage device were removable and insertable into another data processing system, the use of the operating system, applications, settings, and the like, on the storage device may not be possible due to differences in system configuration. Thus, for example, if a permanent storage device were removed from one data processing system having a first set of peripheral devices, and placed in another data processing system having a second set of peripheral devices, the drivers stored on the storage device would not be compatible with the second set of peripheral devices. As a result, the user would be required to load new drivers for all of the new peripheral devices in the second set of peripheral devices. Such a task is extremely tedious.

In addition, in known data processing systems, if a user wishes to make use of the same applications, and their settings, that he/she used on a different data processing system, the data processing system must either already have those applications loaded or the user must install those applications for his/her use. Furthermore, any changes the user may make to the data processing system configuration may be overridden by subsequent users and thus, the user may have to reconfigure the data processing system each time he/she makes use of it.

While, for the most part, data processing systems today boot from permanent hard disks, there are occasions where a boot disk, such as a floppy disk, is used to boot the data processing system. However, these boot disks only contain a copy of the operating system that is in a form ready to load into the computer. Thus, the boot disks of known systems only contain a general copy of the operating system from which a computer may be booted. Any customization that may have been performed by a user will not be included in the operating system on the boot disk.

Thus, with the known systems, there is no mechanism by which a user may take customized settings from one data processing system and use them with a subsequent data processing system. It would be beneficial to have an apparatus, system and method for booting a data processing system from a removable medium in which the custom settings of a user are thereby transferable to a plurality of different data processing systems.

SUMMARY OF THE INVENTION

The present invention provides an apparatus, system and method for booting a data processing system from a removable medium. With the present invention, a boot sequence is started to a point at which a file system is available. At that time, driver files and registry information is copied from the data processing system to the removable medium. The boot sequence is then restarted using the driver files and registry information copied. In this way, a removable medium, having application data and user defined setting information, may be used to customize a plurality of different data processing systems while still providing the user access to the particular data processing system configuration and peripheral devices of the data processing system. Thus, the user's customized settings provide a system interface that is familiar to the user while being able to make use of different hardware devices.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
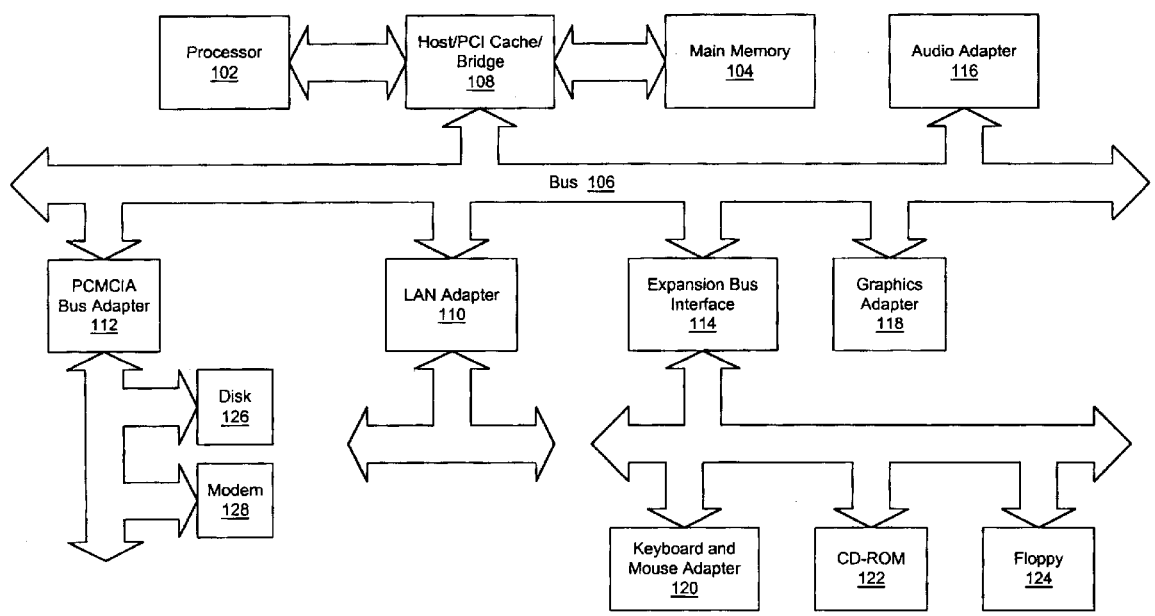
FIG. 1 is a pictorial representation of a data processing system in which the present invention may be implemented.

With reference now to the figures, and in particular with reference to FIG. 1, a pictorial representation of a data processing system is depicted in which the present invention may be implemented. The data processing system 100 may be any type of data processing system, including a server computer, a client computer, stand-alone computer, portable data processing system, and the like. In one particular embodiment, the data processing system 100 is an example of a laptop computer. Data processing system 100 employs a peripheral component interconnect (PCI) local bus architecture. Although the depicted example employs a PCI bus, other bus architectures, such as Micro Channel and ISA, may be used.

Processor 102 and main memory 104 are connected to PCI local bus 106 through PCI bridge 108. PCI bridge 108 may also include an integrated memory controller and cache memory for processor 102. Additional connections to PCI local bus 106 may be made through direct component interconnection or through add-in boards. In the depicted example, local area network (LAN) adapter 110, Personal Computer Memory Card International Association (PCMCIA) bus adapter 112, and expansion bus interface 114 are connected to PCI local bus 106 by direct component connection. In contrast, audio adapter 116 and graphics adapter 118 are connected directly to PCI local bus 106. Expansion bus interface 114 provides a connection for a keyboard and mouse adapter 120, CD-ROM 122, and floppy disk drive 124.

In the depicted example, PCMCIA bus adapter 112 provides a connection for PC card devices. A PC card is a credit-card sized, removable module for portable computers standardized by Personal Computer Memory Card International Association (PCMCIA). PC Cards are also known as "PCMCIA cards." PC Cards are 16-bit devices that are used to attach modems, network adapters, sound cards, radio transceivers, solid state disks and hard disks to a portable computer. The PC Card is a "plug and play" device, which is configured automatically by Card Services software.

In order to use a PC Card slot in the computer, Card and Socket services must be loaded, typically at system startup. Card and Socket Services software is generally included with laptops that have PC Card slots. It also comes packaged with PC Cards. Card Services manage system resources required by the PC Card, and, on PCs, determines which IRQs and memory and I/O addresses are assigned. They also manage hot swapping and pass changes in events to higher-level drivers written for specific cards. Card Services talk to Socket Services, which is the lowest level of software that communicates directly with the PC Card controller chips. Socket Services can be built into the system BIOS or added via software.

A typical portable data processing system can accept two PC cards at one time. In the depicted example, hard disk drive 126 and modem 128 are shown, although additional devices may be connected tot he PCMCIA bus adapter 112. The hard disk drive 126 may be, for example, an IBM microdrive configured for a PC card interface. This hard disk drive 126 can hold up to 1 Gb of information which is adequate to hold a variety of applications and user specific data. This hard disk drive 126 is available in alternative interfaces, such as a compact flash interface. Although a PCMCIA interface for a portable computer is depicted, one of ordinary skill in the art will appreciate that the microdrive may also interface with a desktop computer using a PCMCIA interface or a compact flash reader, as appropriate.

An operating system runs on processor 102 and is used to coordinate and provide control of various components within data processing system 100 in FIG. 1. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 1 may vary depending on the implementation. The depicted example is not meant to imply architectural limitations with respect to the present invention. For example, the computer system may be a desktop system capable of interfacing to a wide variety of devices.

While the present invention will be describe with reference to the use of a PC card and PCMCIA bus adapter 112, it should be noted that the principles of the present invention are not limited to these particular hardware configurations. Rather, the present invention may be operable with any type of medium from which a computer system may be booted in the manner to be described hereafter. These medium may include, for example, floppy diskettes, CD-ROMs, DVD-ROMs, removable hard drives, ZIP or JAZZ disks, magnetic tape, ZIP CD-ROMs, and the like. For purposes of explanation, the present description will assume a PCMCIA bus adapter 112 and PC card are used to perform the functions of the present invention.

Figure 2:
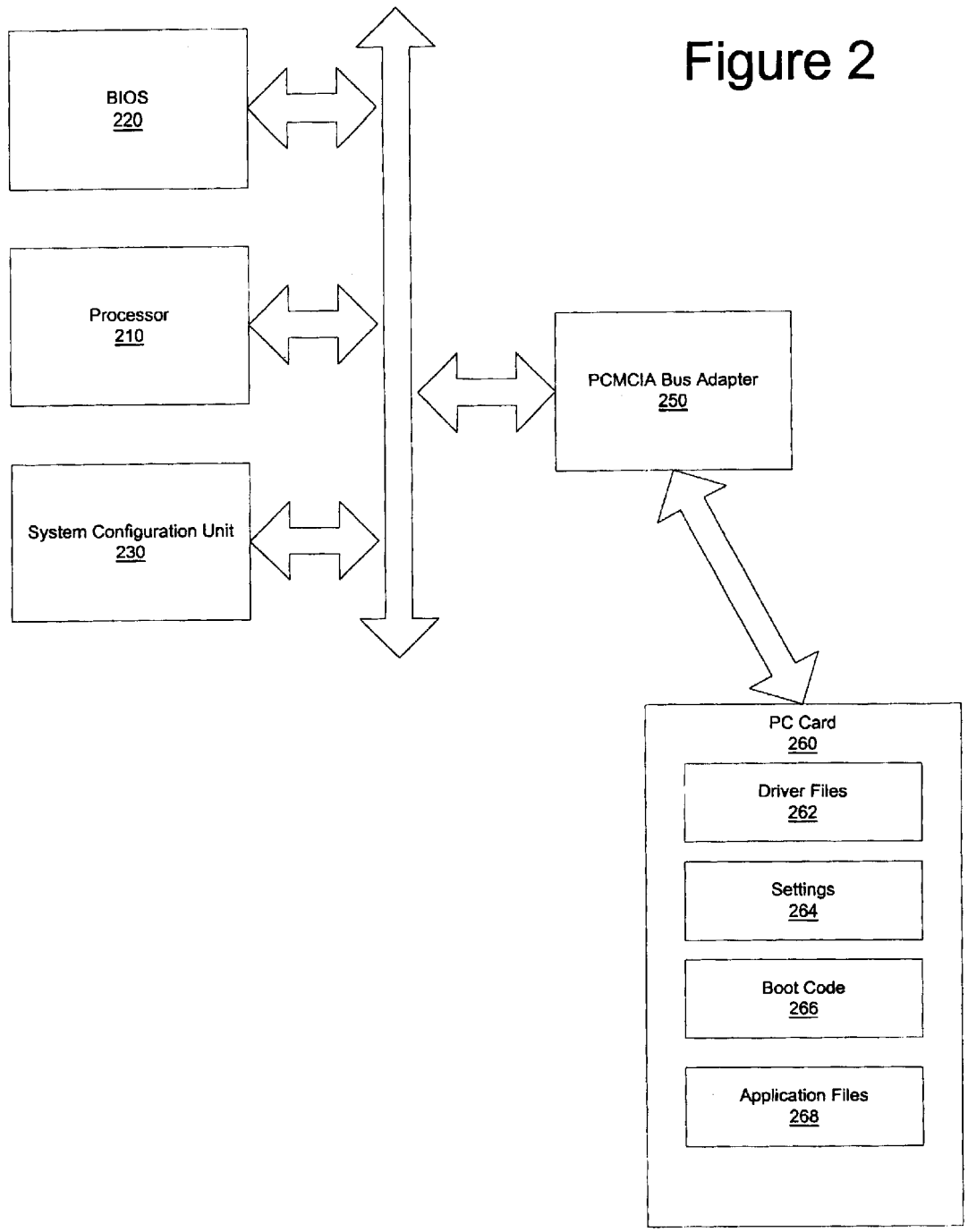
FIG. 2 is an exemplary diagram of the principle components in the data processing device used to boot the system.

FIG. 2 is an exemplary block diagram illustrating the primary components of the data processing system and the use of a PC card to boot the data processing system. As shown in FIG. 2, the primary components of the data processing system that are involved in the booting of the system are the processor 210, the BIOS 220, and the system configuration unit 230. The data processing system boots from a PC card 260 via the PCMCIA bus adapter 250 in a manner described hereafter.

The PC card 260 includes various storage areas 262–266 for storing information used to boot the data processing system. In addition, the PC card 260 may include application data 268 for use by the data processing system in providing a user with various applications for use.

As shown in FIG. 2, these areas may include a driver files storage area 262, a settings storage area 264, and a boot code storage area 266. Other information, in addition to or in replacement of the information shown in FIG. 2, may be used without departing from the spirit and scope of the present invention.

The processor 210 facilitates the operation of the operating system and applications 268 on the data processing system. The system configuration unit 230, which may be a flash ROM or small hard drive connected to the system bus, for example, stores driver and registry entry files for the peripheral devices supported by the data processing system. The registry entry files contain information identifying the settings of the peripheral devices. In addition, other files containing user defined or system defined settings may be stored in the system configuration unit 230. Such settings may include, for example, a keyboard repeat sequence, pointing device sensitivity settings, IP address, and the like.

The Basic Input Output System (BIOS) 220 is an essential set of routines in a data processing system, which is stored on a chip and provides an interface between the operating system and the hardware. The BIOS supports all peripheral technologies and internal services such as the realtime clock (time and date).

On startup, the BIOS tests the system and prepares the computer for operation by querying its own small Complementary Metal Oxide Semiconductor (CMOS) memory bank for drive and other configuration settings. It searches for other BIOS's on plug-in boards and sets up pointers (interrupt vectors) in memory to access those routines. It then loads the operating system and passes control to it. The BIOS accepts requests from the drivers as well as the application programs.

The BIOS in the present invention is modified such that the register entry of the PCMCIA boot drive (or PCMICIA bus adapter) is added to the register file of the CMOS memory of the BIOS. Thus, upon boot-up, the BIOS knows to look for boot files on a PC card associated with the PCMCIA boot drive. Modification of the CMOS may be performed in a known manner, such as pressing the DEL key on the keyboard during start-up of the system and changing the boot sequence to check the PCMCIA boot drive first.

During a boot operation, the power to the data processing system is turned on and the BIOS tests the system and querys its own CMOS for registry information. Based on the registry information, the BIOS checks the PCMCIA boot drive for boot code. If a PC card 260 having boot code 266 is present in the PCMCIA boot drive, the data processing system will begin to execute the boot code 266.

During a boot-up operation, the boot code 266 instructs the data processing system to boot an operating system to a point at which the file system for the operating system is available. Once the file system is available, files may be copied or appended to. At this time, the boot code 266 causes the processor 210 to copy the driver and registry files from the system configuration unit 230 to the driver files and settings storage areas 262 and 264 on the PC card 260.

Only those setting files that are not already present in storage area 264 are automatically copied over to the setting storage area 264. If a setting file already exists in storage area 264, the user may be prompted as to whether or not he/she wishes the overwrite the existing file. If not, the old setting file is maintained in storage area 264. If so, the old setting file is overwritten with the new setting file.

Once the driver files and settings are stored on the PC card 260, the boot code 266 causes the BIOS to restart the boot sequence from the PC card using the newly copied driver files and settings. Thus, a user may boot a data processing system with drivers particular to the data processing system but with settings that are customized by the user on this or a different data processing system.

Once booted, the data processing system may make use of applications stored in the application data storage area 268 of the PC card. Thus, the data processing system is provided with access to applications that are not stored on a fixed hard drive in the data processing system. In this way, a user may make use of the same PC card in a plurality of different data processing systems and be able to have access to the same applications he would have had on his own data processing system. Furthermore, these applications will have settings customized to the user based on the settings data stored in the settings storage area 264.

On a shutdown of the system, the BIOS may instruct that the driver files copied to the PC card 260 be deleted automatically. In this way, the boot code 266 on the PC card will continue, in later boot operations, to copy driver files from systems in which it is operating since driver files will not be present in the driver file storage area 262.

Thus, with the present invention, the peripherals of the data processing system are enabled for use by the user while allowing for the data processing system to be customized by the user based on the settings information maintained on the PC card. Thus, if a user were to use this same PC card in another data processing system having a different configuration, the data processing system will be booted with settings established by the user even though the configuration of the data processing system may be different.

For example, suppose a user originally was working on a computer having a Lexmark brand printer with associated drivers. The user may make use of a word processing program stored on the PC card to create a document. The user is able to print the document using his computer because the computer has the appropriate drivers for the Lexmark printer loaded.

However, now assume that the user travels to another location and wishes to continue working on the document. With conventional systems, if the computer in the new location does not have the appropriate word processing program, the user may not be able to access his/her document file. With the present invention, however, since the word processing program is present on the PC card, the user is able to access the program and continue working on the document. Furthermore, since the settings for the word processing program are also stored on the PC card, the word processing program will be customized to the user's original settings.

Furthermore, with the present invention, the user will be able to print his/her document because the computer in the new location is loaded with the drivers for the printer attached to that computer. Thus, even though the original computer system used to create the document had a different printer than the computer in the new location, the document may still be printed without error.

In addition, other settings of the computer system may be utilized to customize the computer in the new location. For example, the settings stored on the PC card may indicate the type of background for the display, the icon types, the pointer type, the sensitivity of the mouse interface, the screensaver type and time settings, password and userid settings, and the like. These setting can be stored, for example, in a batch file that may contain all the generic user interface settings such as mouse sensitivity, keyboard repeat rate, volume levels, etc., that can then be added to whichever mouse, display, sound card, etc. that is the system defined hardware.

Thus, in all respects, the computer in the new location will appear to function the same as the computer on which the user customized his settings. The only difference may be that different peripheral devices are used having different drivers.

Figure 3:
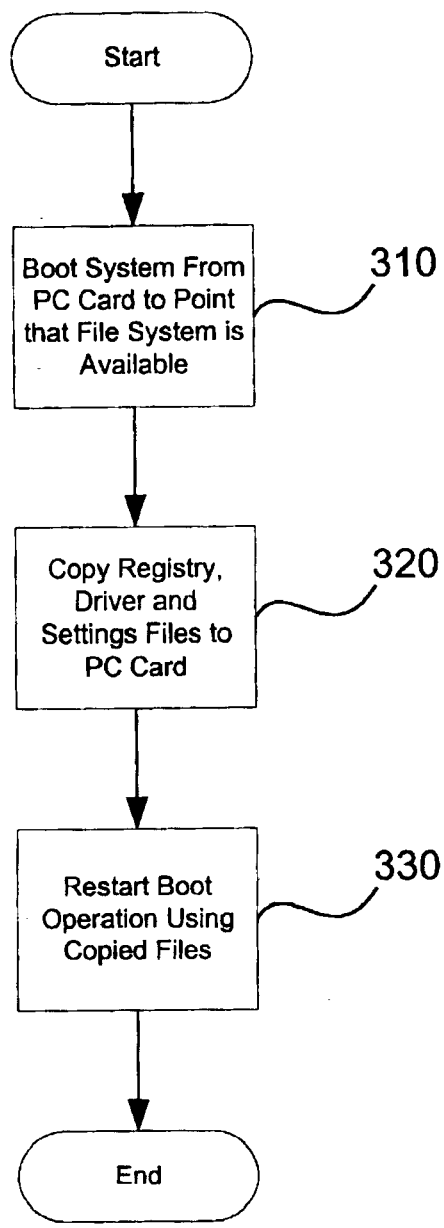
FIG. 3 is a flowchart outlining an exemplary operation of the present invention.

FIG. 3 is a flowchart outlining an exemplary operation of the present invention. As shown in FIG. 3, the operation starts with booting the system from the PC card to a point that the file system is available (step 310). Then the driver and registry information on the system is copied to the PC card (step 320). The boot sequence is then restarted using the copied files (step 330). Although not shown in FIG. 3, as mentioned above, the operation may further include deleting the driver files from the PC card upon shutdown of the system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed:

1. A method for booting a data processing system from a removable boot medium, comprising:

starting a boot sequence of a first data processing system to a point where a file system is available;

copying driver, registry and application information from the first data processing system to the removable boot medium; and starting, in a second data processing system, a the boot sequence from the removable boot medium using the driver, registry and application information copied from the first data processing system, wherein the application information includes user defined settings for at least one application present on the first data processing system, and wherein the first and the second data processing system may be the same or different data processing systems.

2. The method of claim 1, wherein starting a boot sequence in the second data processing system includes causing a BIOS to look for boot code on a drive associated with the removable boot medium and executing the boot code.

3. The method of claim 1, wherein the removable boot medium includes storage areas for the driver and registry information, and wherein only driver and registry information from the first data processing system that is not already present in the storage areas is copied to the storage areas.

4. The method of claim 1, wherein the registry information includes at least one of user defined settings and system settings.

5. The method of claim 1, wherein the driver in formation is particular to the first data processing system and wherein the registry information is customized by a user.

6. The method of claim 5, wherein the registry information is customized by the user by the user inputting a response to overwrite driver and registry information that is already present in the setting storage area of the second data processing system.

7. The method of claim 1, further comprising executing one or more applications stored in an application data storage area of the removable boot medium.

8. The method of claim 1, wherein the removable boot medium is a PCMCIA card.

9. The method or claim 1, wherein the removable boot medium is one of a floppy diskette, a CD-ROM, a DVD-ROM, a removable hard drive, a ZIP diskette, a JAZZ diskette, a magnetic tape, and a ZIP CD-ROM.

10. The method of claim 1, wherein the removable boot medium includes boot code and storage areas for driver files and settings files.

11. The method of claim 10, wherein the removable boot medium further includes application information that is not stored on a fixed hard disk drive in the second data processing system.

12. The method of claim 1, wherein starting a boot sequence in the second data processing system includes modifying the BIOS of the second data processing system by adding the register entry of the removable boot medium to the register file of the CMOS memory of the BIOS.

13. An apparatus for booting a data processing system from a removable boot medium, comprising:
    A data processing system; and
    A removable boot medium coupled to a first data processing system, wherein the first data processing system starts a boot sequence from the removable boot medium to a point where a file system is available, copies driver, and registry and application information from the first data processing system to the removable boot medium, and starts the boot sequence, in a second data processing system from the removable boot medium using the driver, registry and application information copied from the first data processing system, wherein the application information includes user defined settings for at least one application present on the first data processing system, and wherein the first and the second data processing system may be the same or different data processing systems.

14. The apparatus of claim 13, wherein the second data processing system starts a boot sequence by causing a BIOS to look for boot code on a drive associated with the removable boot medium and executes the boot code.

15. The apparatus of claim 13, wherein the removable boot medium includes storage areas for the driver and registry information, and wherein the second data processing system copies only driver and registry information from the first data processing system that is not already present in the storage areas.

16. The apparatus of claim 13, wherein the registry information includes at least one of user defined settings and system settings.

17. The apparatus of claim 13, wherein the driver information is particular to the first data processing system and wherein the registry information is customized by a user.

18. The apparatus of claim 17, wherein the registry information is customized by the user by the user inputting a response to overwrite driver and registry information that is already present in the setting storage area of the second data processing system.

19. The apparatus of claim 13, wherein the data processing system executes one or more applications stored in an application data storage area of the removable boot medium.

20. The apparatus of claim 13, wherein the removable boot medium is a PCMCIA card.

21. The apparatus of claim 13, wherein the removable boot medium is one of a floppy diskette, a CD-ROM, a DVD-ROM, a removable hard drive, a ZIP diskette, a JAZZ diskette, a magnetic tape, and a ZIP CD-ROM.

22. The apparatus of claim 13, wherein the removable boot medium includes boot code and storage areas for driver files and settings files.

23. The apparatus of claim 22, wherein the removable boot medium further includes application data information that is not stored on a fixed hard disk drive in the second data processing system.

24. The apparatus of claim 13, wherein the second data processing system starts a boot sequence by modifying the BIOS of the second data processing system which includes adding the register entry of the removable boot medium to the register file of the CMOS memory of the BIOS.

25. A computer program product in a computer readable medium for booting a data processing system from a removable boot medium, comprising:
    first instructions for starting a boot sequence of the first data processing system to a point where a file system is available;
    second instructions for copying driver, registry and application information from the first data processing system to the removable boot medium; and
    third instructions for starting the boot sequence in a second data processing system from the removable boot medium using the driver and registry information copied from the data processing system, wherein the application information includes user defined settings for at least one application present on the first data processing system, and wherein the first and the second data processing system may be the same or different data processing systems.

26. The computer program product of claim 25, wherein the third instructions for starting a boot sequence in the second data processing system includes instructions for causing a BIOS to look for boot code on a drive associated with the removable boot medium and executing the boot code.

27. The computer program product of claim 25, wherein the removable boot medium includes storage areas for the driver and registry information, and wherein only driver and registry information from the first data processing system that is not already present in the storage areas is copied to the storage areas.

28. The computer program product of claim 25, wherein the registry information includes at least one of user defined settings and system settings.

29. The computer program product of claim 25, wherein the driver information is particular to the first data processing system and wherein the registry information is customized by a user.

30. The computer program product of claim 29, wherein the registry information is customized by the user by the user inputting a response to overwrite driver and registry information that is already present in the setting storage area of the second data processing system.

31. The computer program product of claim 25, further comprising fourth instructions for executing one or more applications stored in an application data storage area of the removable boot medium.

32. The computer program product of claim 25, wherein the removable boot medium is a PCMCIA card.

33. The computer program product of claim 25, wherein the third instruction for starting a boot sequence includes instructions for modifying the BIOS of the second data processing system by adding the register entry of the removable boot medium to the register file of the CMOS memory of the BIOS.

34. A removable boot medium, comprising:
    a first storage area for storing driver files;
    a second storage area for storing registry files; and
    a third storage area for storing boot code, wherein the boot code is used to boot a data processing system to a point at which a file system is available, at least one of the first storage area and second storage area are written to based on driver, registry and application information for a data processing system with which the removable boot medium is operating, and wherein the boot code is started after the at least one of the first storage area and the second storage area are written to, to thereby boot the data processing system using the driver files, registry files and application files in the first and second storage areas, wherein application files includes user defined settings for at least one application present on a data processing system.

* * * * *

UNITED STATES PATENT AND TRADEMARK OFFICE
CERTIFICATE OF CORRECTION

PATENT NO. : 6,718,463 B1  Page 1 of 1
APPLICATION NO. : 09/640542
DATED : April 6, 2004
INVENTOR(S) : Malik It is certified that error appears in the above-identified patent and that said Letters Patent is hereby corrected as shown below:

Col. 6, line 64: after "system, a" delete "the".

Col. 7, line 20: after "driver" delete "in formation" and insert --information--.

Col. 7, line 56: after "driver," delete "and".

Col. 7, line 59: after "system" insert --,--.

Col. 8, line 33: after "application" delete "data".

Signed and Sealed this

Fourteenth Day of November, 2006

JON W. DUDAS
*Director of the United States Patent and Trademark Office*